Oct. 26, 1937.   A. KNECHT   2,096,901
WIND SCREEN
Filed April 19, 1937   2 Sheets-Sheet 1
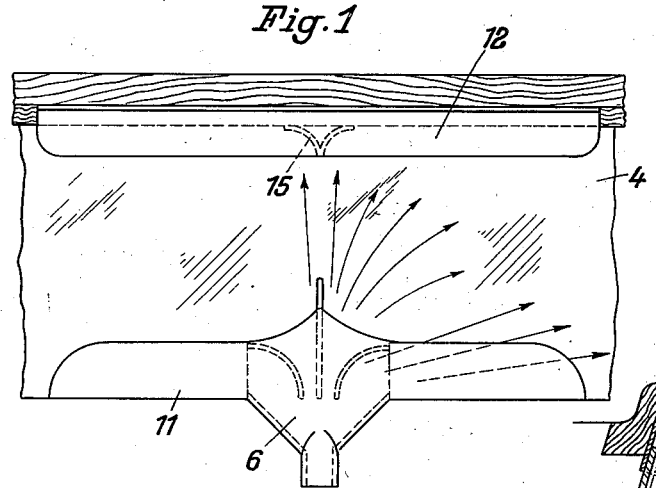
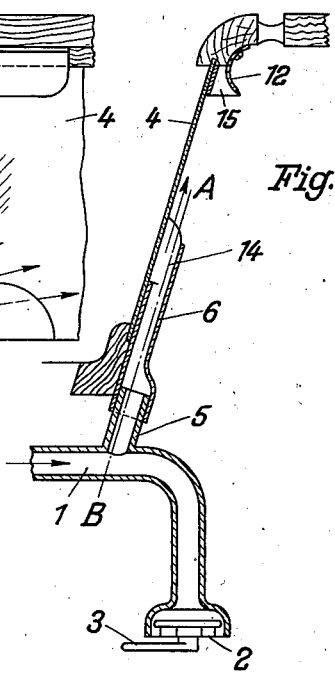
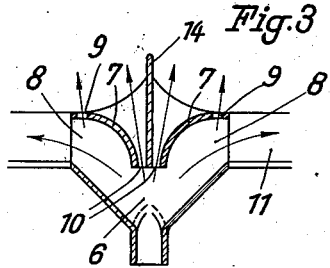
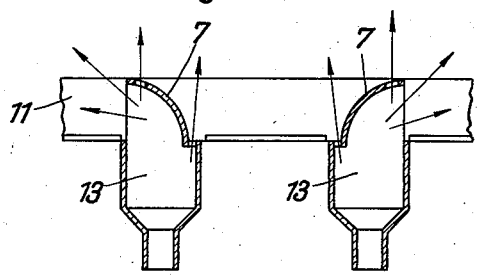
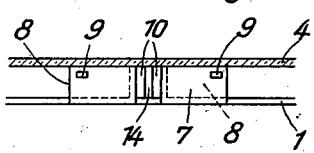
Inventor:
Albert Knecht Oct. 26, 1937.    A. KNECHT    2,096,901
WIND SCREEN
Filed April 19, 1937    2 Sheets-Sheet 2
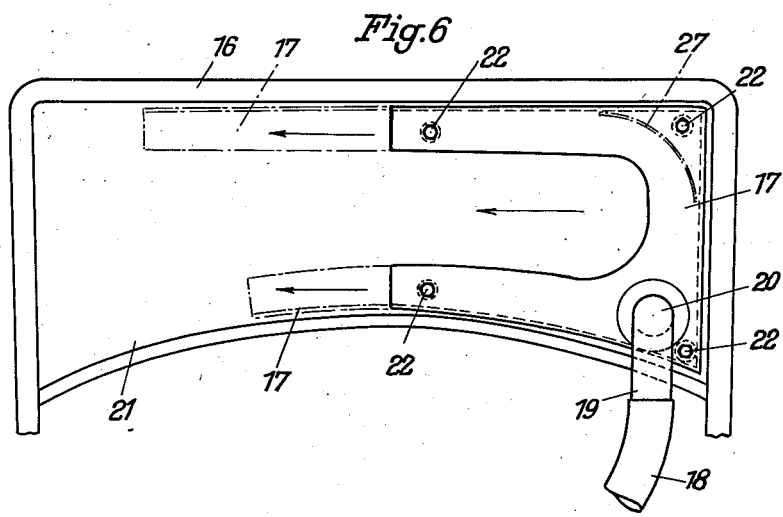
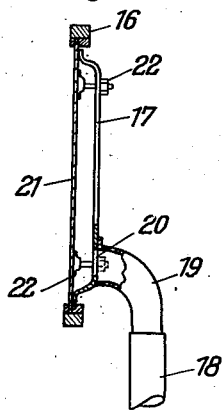
Inventor:
Albert Knecht Patented Oct. 26, 1937

2,096,901

UNITED STATES PATENT OFFICE 2,096,901

WIND SCREEN

Albert Knecht, Wilen, Switzerland

Application April 19, 1937, Serial No. 137,867
In Germany April 6, 1936

4 Claims. (Cl. 20—40.5)

The invention relates to windscreens and more particularly to windscreens of motor-vehicles with closed bodies.

One object of the invention is the provision of means to hold the wind screens dry and to prevent the condensation of moisture on the windscreens and a further object is the provision of means to keep at least one of the side panels dry and free from condensed moisture.

In my Patent 2,030,258 I attain these objects by the use of two panes of glass or the like said panes being arranged at a certain distance one behind the other and a preheated air flow passing between these two panes.

According to the present invention I substitute the second pane by a pair of bordering pieces, of L-shaped cross section extending along the upper and lower edge respectively of the windscreen pane and letting free a part of the surface of the windshield between said bordering pieces. For the detailed description of my invention reference may be had to the following specification and the accompanying drawings forming a part thereof, wherein:

Fig. 1 is a view of a wind screen with the bordering pieces seen from the interior of the vehicle.

Fig. 2 is a vertical middle section of Fig. 1 completed by the air introducing tube.

Fig. 3 is a partial section on the line A—B of Fig. 2.

Fig. 4 is a plan view to Fig. 3.

Fig. 5 is a section as Fig. 3 of a modified form of the lower bordering piece.

Fig. 6 is a view seen from the interior of the vehicle of a further modification, the upper and lower bordering pieces being joined to a bordering frame having substantially the shape of a horizontal U.

Fig. 7 is a cross section of Fig. 6.

In Figs. 1–5 of the drawings 1 indicates the air introducing tube arranged beneath the windshield 4 and provided preferably at its end with a regulating device 2, 3 for the purpose to let, if desired, warm air into the interior of the vehicle. A branch 5 (or as shown in Fig. 5, two branches) is arranged for the connection with a flatted mouth piece 6 the shape of which is shown in Figs. 2 and 3 and which may be provided in a known manner with curved guiding walls 7, side slots 8 and further openings 9 and 10 from which the warm air escapes. This mouth piece is completed, according to my invention, by a lower bordering piece 11 and an upper one 12 of substantially L shaped cross section. The lower piece 11 may be made, as shown in the drawings, of one piece with the mouth piece 6 or it may be made as a separate piece connected in a suitable manner to said mouth piece. The upper bordering piece 12 may instead of being fastened to the frame of the windscreen, as shown, be made with this frame of one piece. In Fig. 7 two mouth pieces 13 are provided from which the air escapes in opposite directions, a space remaining between the two mouth pieces. Preferably a middle separating wall 14 is provided in Figs. 1, 2 and 3 and may also be provided at the place of the dotted middle line shown in Fig. 5. Also on the upper bordering piece 12 a similar separating wall or angle piece 15 may be provided. The arrangement of such middle separating means has the advantage to secure an equal distribution of the air from the middle to both sides of the windscreen.

In the modified form of Figs. 6 and 7 16 indicates the framing of the windscreen 21. The lower and upper bordering pieces of the hereinbefore described modification are joined at one side (the right one in Fig. 6) by an upright connecting part to a bordering frame 17 of substantially L shaped cross section such bordering frame showing the shape of horizontal U open at one side (the left one in Fig. 6). The frame 17 is fixed in any suitable known manner f. i. by means of suction pieces provided with screw nuts 22 on the wind screen pane 21. The warmed air is admitted by means of a pipe 18 and a curved tube or bend 19 through an opening 20 against the windshield or windscreen pane 21 at the lower corner of the bordering frame 17 as shown in Figs. 6 and 7. A curved guiding wall 27 may be provided to cover the upper dead corner. The lower and upper bordering legs of the frame 17 may extend to nearly midway of the wind screen surface or may be lengthened. They may be lengthened equally or differently as shown by dotted lines in Fig. 6. The lower and upper bordering pieces of Figs. 1–5 or the U shaped bordering frame of Figs. 6 and 7 may be or may not be made of transparent material. In all cases the lower and the upper bordering pieces of substantially L shaped cross section prevent the air blown in from escaping from the space between pane and bordering piece downward or upward respectively and force the air to pass as a flat layer along the inner surface of the windscreen pane holding the pane surface between said bordering pieces dry and free from condensed moisture. In the modification of Figs. 1–5 also the adjacent side panels are touched by said air layer and in the modification of Figs. 6 and 7 also one of the side panels (the left one), at least if the upper and lower leg of the bordering frame 17, are lengthened as shown in dotted lines in Fig. 6.

One advantage over the double pane device of my earlier patent referred to is the possibility of a more easy and convenient cleaning of the inner surface of the windshield proper or windscreen pane from dirt or other nuisances.

What I claim is:

1. A wind screen for motor vehicles, comprising a windshield proper, a lower and an upper bordering piece of substantially L-shape in cross section arranged inwardly from the windshield proper, the upper bordering piece being open at the bottom and the lower bordering piece being open at its upper side, such open portions forming with the windshield air passages along the top and bottom of said windshield, and means for introducing warmed air throughout the space between the windshield and the lower bordering piece.

2. A wind screen for motor vehicles, comprising a windshield proper, a lower and an upper bordering piece of substantially L-shape in cross section arranged inwardly from the windshield proper, the upper bordering piece being open at the bottom and the lower bordering piece being open at its upper side, such open portions forming with the windshield air passages along the top and bottom of said windshield, the lower and upper bordering pieces being joined at one side by an upright part to a substantially U-shaped bordering frame, and means for introducing warmed air throughout the space between the windshield and the lower bordering piece.

3. A wind screen for motor vehicles, comprising a windshield proper, a lower and an upper bordering piece of substantially an L-shaped cross section arranged inwardly from the windshield proper and extending over more than half the width of the windshield, the upper bordering piece being open at the bottom and the lower bordering piece being open at its upper side, such open portions forming with the windshield air passages along the top and bottom of said windshield, and means for introducing warmed air throughout the space between the windshield and the lower bordering piece.

4. A wind screen for motor vehicles, comprising a windshield proper, an L-shaped bordering piece at the upper edge of the windshield, one member of the bordering piece extending downwardly and spaced from the windshield, a deflector arranged in the space intermediate the length thereof, a second L-shaped bordering piece at the lower edge of the windshield, one member of the bordering piece at the lower edge of the windshield extending upwardly and spaced from the windshield, and means for introducing warmed air to the space at the lower edge of the windshield.

ALBERT KNECHT.